Nov. 1, 1966  F. COHEN  3,281,988
LAWN EDGING MATERIAL
Filed Aug. 7, 1964
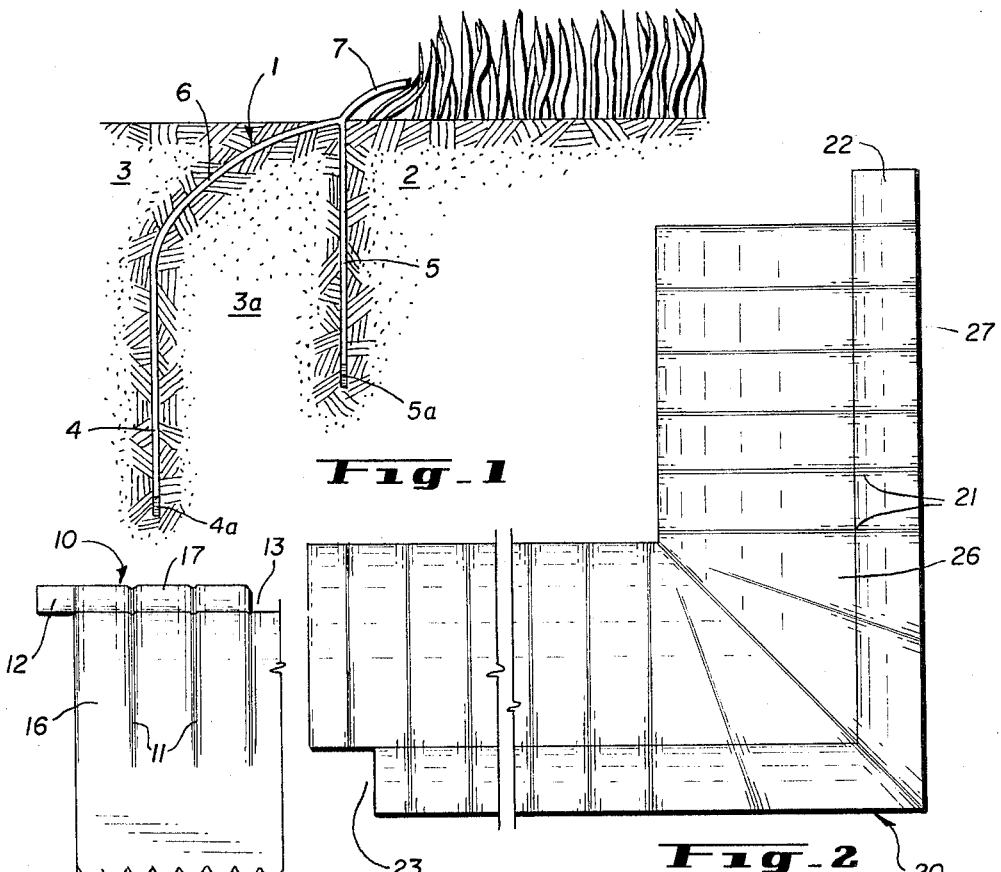
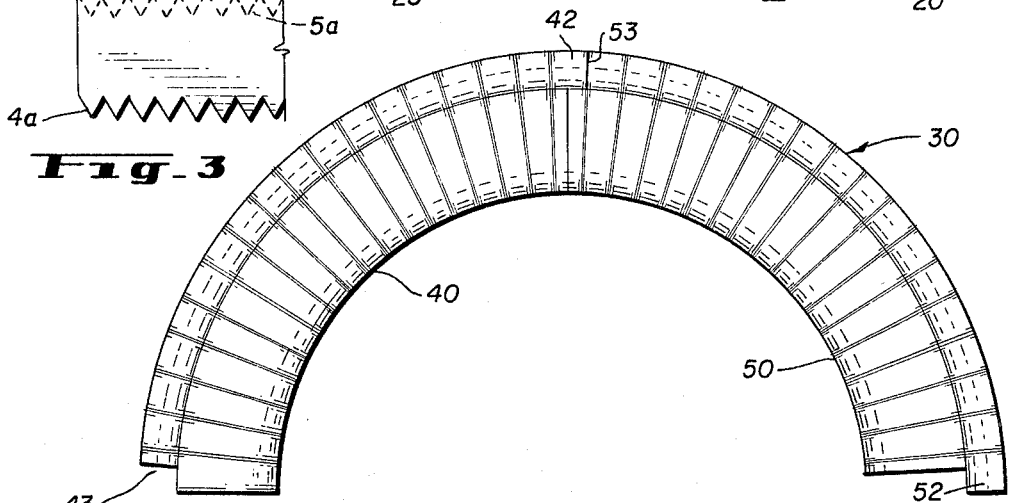
INVENTOR.
Felix Cohen
BY
ATTORNEYS

United States Patent Office 3,281,988
Patented Nov. 1, 1966

3,281,988
LAWN EDGING MATERIAL
Felix Cohen, 2465 S. Kearney St., Denver, Colo.
Filed Aug. 7, 1964, Ser. No. 388,131
15 Claims. (Cl. 47—33)

My invention relates generally to edging materials and more particularly to an improved edging material for lawn and garden use.

Grass which adjoins other soil areas has the undesirable effect of spreading into those soil areas ultimately requiring its removal by excavation. Edging materials have proved satisfactory in inhibiting grass growth into adjoining soil areas.

Accordingly, it is an object of my invention to provide an improved edging material which is simple in construction, attractive, durable, easy to install, and is substantially indestructible.

It is another object of this invention to provide an edging material which will inhibit grass growth both above and below the surface level of the ground.

It is a further object of my invention to provide an improved edging material of interchangeable sections which will accommodate soil areas of various configurations.

Further objects and advantages of my invention will become apparent as the following description proceeds and the features of novelty which characterize my invention will be pointed out with particularity in the claims annexed to and forming a part of this invention. For a better understanding of my invention, reference may be had to the accompanying drawings in which:

FIG. 1 is a section view of edging material embodying my invention;

FIG. 2 is a front elevation view of an oblong section of edging material embodying my invention;

FIG. 3 is a plan view of a right angle section of edging material embodying my invention; and FIG. 4 is a plan view of a semi-cylindrical section of two symmetrical segments of edging material embodying my invention.

Referring now to the drawings, a sectional view of the edging material of FIG. 1 shows that it comprises an elongated body generally designated by numeral 1 for separating an adjoining grassed area 2 and soil area 3.

Elongated body 1 includes substantially parallel depending portions 4 and 5 which extend into forwardly and rearwardly earth penetrating positions with the forward position bordering or within soil area 3 and the rearward position within the grassed area or disposed between the soil area and the grassed area. The lower edges of depending portions 4 and 5 are preferably serrated as shown at 4a and 5a providing sharp edges to facilitate penetration into the earth.

An intermediate or interconnecting portion 6 extends between the tops of depending portions 4 and 5 thereby covering a length of soil area 3a. The cross section of interconnecting portion 6 is arcuate and slopes downwardly from the top of depending portion 5 to the top of depending portion 4 so that the latter depending portion is at a lower elevation. Depending portion 4 extends to a substantially lower penetrating depth than depending portion 5.

An overhanging or cantilever portion 7 merges with interconnecting portion 6 and extends rearwardly from the top of depending portion 5 in spaced overhanging relation to the bordering grass area 2. The angle of cantilever portion 7 with the horizontal may vary but it is preferably about 45°.

Intrusion of the grass from grass area 2 into soil area 3 is prevented by depending portion 5 which penetrates the earth to a depth substantially below grass root level. Further intrusion is prevented by cantilever portion 7 which blocks sun rays with its overhanging surface and thereby inhibits grass growth thereunder.

Body 1 is preferably made of a stiff, durable material and preferably is molded. The upper surface is preferably corrugated to increase its mechanical strength and facilitate water drainage. Various segments of desired length and configuration are possible with interfitting ends to accommodate different arrangements of soil and grass areas.

The edging material of FIG. 2 is shown as an oblong section generally designated by numeral 10. The upper surface of this section has corrugations 11 in the interconnecting portion 16 and the cantilever portion 17 which extend transversely of its length to increase the mechanical strength of the body and to accommodate water drainage back onto the soil area. The ends of oblong section 10 are provided for joining engagement with abutting portions of an adjoining section by an extension 12 of the cantilever portion 17 at one end and a recess 13 of approximately the same length as extension 12 at the opposite end of cantilever portion 17. This end feature on each section facilitates a continuous strip of edging material of a multiple of sections to accommodate various lengths of soil and grass areas.

A right angle section of edging material is shown in FIG. 3 and is generally designated numeral 20. The upper surface of this section has corrugations 21 in the interconnecting portion 26 and cantilever portion 27 which extend transversely of its length. The ends of this section extend at right angles to each other. At one end, cantilever portion 27 provides an extension 22 and at the other end a recess 23 for joining engagement with abutting portions of a corresponding adjoining section. This right angle section is preferably molded as a single piece unit but could also be divided at a 45-degree angle intermediate its ends.

Referring to FIG. 4, there is shown a semicircular section of edging material generally designated by numeral 30 for separating grassed and soil areas surrounding a tree or other generally circular object. This section includes corrugations in its upper surface similar to that described in the previous embodiments. This semicircular section is preferably divided into two symmetrical sections 40, 50, each extending approximately 45°. Section 40 has at one end an extension 42 and at the other end a recess 43. Section 50 has at one end a recess 53 in joining engagement with abutting extension 42 and at the opposite end an extenison 52.

Although I have illustrated specific embodiments of my invention, various modifications will occur to those skilled in the art. Therefore, I do not desire my invention to be limited to the specific details illustrated and described and I intend by the appended claims to cover all modifications which fall within the spirit and scope of my invention.

I claim:

1. Edging material for separation of adjoining grassed and soil areas comprising an integral body of stiff material having substantially parallel depending portions adapted to be inserted into forwardly and rearwardly earth penetrating positions, at least one of said depending portions extending substantially below the soil surface, the forward position being disposed at a soil area and the rearward position being disposed in a bordering grassed area, the vertical extent of said one depending portion being substantially greater than the distance between said depending portions, an interconnecting portion being of arcuate section providing a sloping surface between the tops of the depending portions and merging with a cantilever portion extending rearwardly from the rearward depending portion in spaced overhanging relation to bordering grass in the grassed area.

2. Edging material for separation of adjoining grassed and soil areas comprising an elongated integral body of stiff material having substantially parallel depending portions adapted to be inserted into forwardly and rearwardly earth penetrating positions, said depending portions extending substantially below the soil surface, the forward position being disposed at a soil area and the rearward position being disposed in a bordering grassed area, the minimum extent of said depending portions being of greater extent than the distance between said depending portions, the top of the forward depending portion being at a substantially lower elevation than the top of the rearward depending portion, an interconnecting portion being of arcuate section providing a sloping surface between the tops of the depending portions and merging with a cantilever portion extending rearwardly from the rearward depending portion in spaced overhanging relation to bordering grass in the grassed area.

3. Edging material for separation of adjoining grassed and soil areas comprising an elongated integral body of plural corresponding sections, said body being formed of stiff material and having substantially parallel depending portions adapted to be inserted into forwardly and rearwardly earth penetrating positions, at least one of said depending portions extending substantially below the soil surface, the forward position being disposed at a soil area and the rearward position being disposed in a bordering grassed area, the vertical extent of said one depending portion being substantially greater than the distance between said depending portions, an interconnecting portion of each section being of arcuate section providing a sloping surface between the tops of the depending portions and merging with a cantilever portion extending rearwardly from the rearward depending portion in spaced overhanging relation to bordering grass in the grassed area, the cantilever portion of each section having an extension at one end and a recess of substantially equal length at the opposite end for joining engagement with abutting portions of a corresponding section.

4. Edging material for separation of adjoining grassed and soil areas comprising an elongated integral body of corresponding sections forming a substantially semicircular body section, said body being formed of stiff material and having substantially parallel depending portions adapted to be inserted into forwardly and rearwardly earth penetrating positions, at least one of said depending portions extending substantially below the soil surface, the forward position being disposed in a soil area and the rearward position being disposed at a bordering grassed area, the vertical extent of said one depending portion being substantially greater than the distance between said depending portions, an interconnecting portion of each section being of arcuate section providing a sloping surface between the tops of the depending portions and merging with a cantilever portion extending rearwardly from the rearward depending portion in spaced overhanging relation to bordering grass in the grassed area, the cantilever portion of each corresponding section having an extension at one end and a recess portion of substantially equal length at the opposite end for joining engagement with abutting portions of a corresponding section.

5. Edging material for separation of adjoining grassed and soil areas comprising an elongated integral body of stiff material having substantially parallel depending portions adapted to be inserted into forwardly and rearwardly earth penetrating positions, at least one of said depending portions extending substantially below the soil surface, the forward position being disposed in a soil area and the rearward position being disposed in a bordering grassed area, the vertical extent of said one depending portion being substantially greater than the distance between said depending portions, an interconnecting portion being of arcuate section providing a sloping surface between the tops of the depending portions and merging with a cantilever portion extending rearwardly from the rearward depending portion in spaced overhanging relation to bordering grass in the grassed area, the body at one end having an extended portion and at the other end a recessed portion for permitting joining engagement with corresponding ends of a similar body.

6. Edging material for separation of adjoining grassed and soil areas comprising an elongated integral body of stiff material having substantially parallel depending portions adapted to be inserted into forwardly and rearwardly earth penetrating positions, at least one of said depending portions extending substantially below the soil surface, the forward position being disposed at a soil area and the rearward position being disposed in a bordering grassed area, the vertical extent of said one depending portion being substantially greater than the distance between said depending portions, an interconnecting portion having a sloping surface between the depending portions, and a cantilever portion extending rearwardly from and at least partially supported by the interconnecting portion in spaced overhanging relation to bordering grass in the grassed area.

7. Edging material as set forth in claim 1 wherein said forward depending portion penetrates the soil to a substantially lower level than the rearward portion.

8. Edging material as set forth in claim 1 wherein said cantilever portion is positioned at an angle of about 45° to bordering grass in the grassed area.

9. Edging material for separation of adjoining grassed and soil areas comprising an elongated integral body of stiff material and having substantially parallel depending portions adapted to be inserted into forwardly and rearwardly earth penetrating positions, at least one of said depending portions extending substantially below the soil surface, the forward position being disposed at a soil area and the rearward position being disposed in a bordering grassed area, the vertical extent of said one depending portion being substantially greater than the distance between said depending portions, an interconnecting portion being of arcuate section providing a sloping surface between the tops of the depending portions and merging with a cantilever portion extending rearwardly from the rearward depending portion in spaced overhanging relation to bordering grass in the grassed area, the cantilever portion having an extension at one end and a recess of substantially equal length at the opposite end for joining engagement adjoining sections.

10. Edging material as set forth in claim 9 wherein the elongated body is shaped in the form of a substantially oblong section.

11. Edging material as set forth in claim 9 wherein said elongated body is shaped in the form of a substantially right angle section.

12. Edging material as set forth in claim 1 wherein said elongated body has a corrugated upper surface.

13. Edging material as set forth in claim 1 wherein the lower edges of said depending portions are serrated.

14. Edging material as set forth in claim 1 wherein said integral body is molded.

15. Edging material as set forth in claim 6 wherein the body at one end has an extended portion and at the other end a recessed portion for permitting joining engagement with corresponding ends of a similar body.

References Cited by the Examiner
UNITED STATES PATENTS

| | | | |
|---|---|---|---|
| 1,139,515 | 5/1915 | Haas | 47—33 |
| 2,751,250 | 6/1956 | Block | 239—201 |
| 2,865,136 | 12/1958 | Scott et al. | 47—33 |
| 3,015,448 | 1/1962 | Hurless | 42—25 X |

FOREIGN PATENTS 102,231  11/1916  Great Britain.

ABRAHAM G. STONE, *Primary Examiner.*

J. R. OAKS, *Assistant Examiner.*